Feb. 9, 1926.  
H. J. SCHULTE  
NONSKIDDING DEVICE FOR VEHICLES  
Filed Feb. 20, 1923  2 Sheets-Sheet 1  
1,572,689

INVENTOR  
HENRY J. SCHULTE  
BY  
Graham + Lewis  
ATTORNEYS

Feb. 9, 1926.
H. J. SCHULTE
1,572,689
NONSKIDDING DEVICE FOR VEHICLES
Filed Feb. 20, 1923     2 Sheets-Sheet 2
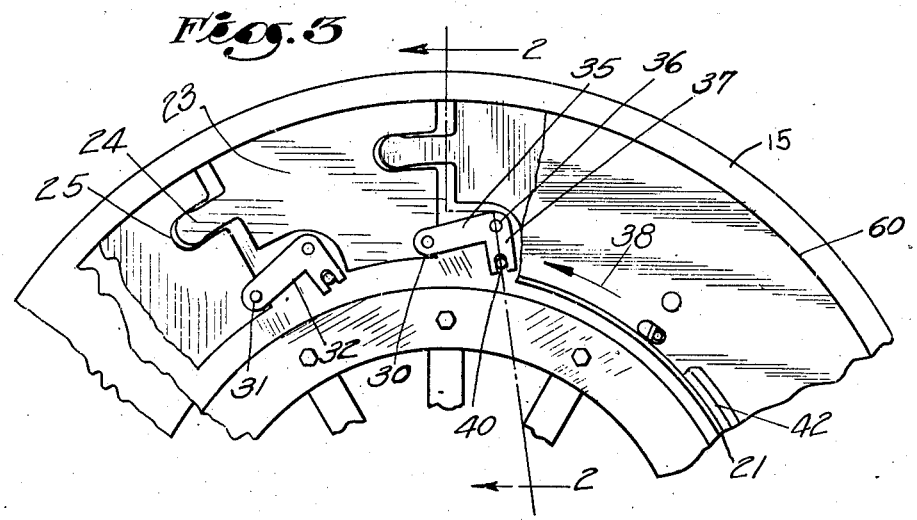
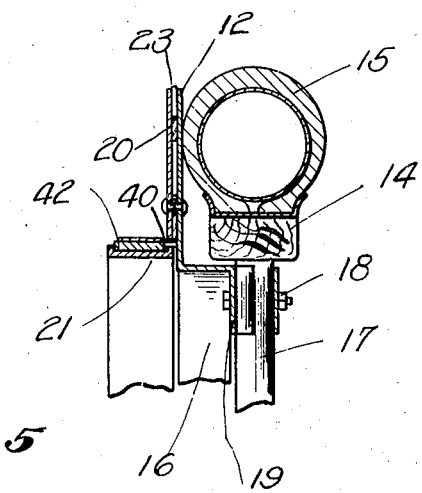
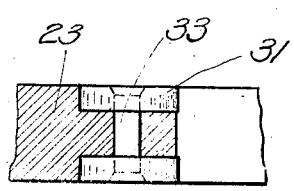
INVENTOR.
HENRY J. SCHULTE
BY
Graham + Lewis
ATTORNEYS Patented Feb. 9, 1926.

1,572,689

UNITED STATES PATENT OFFICE.

HENRY J. SCHULTE, OF ANAHEIM, CALIFORNIA.

NONSKIDDING DEVICE FOR VEHICLES.

Application filed February 20, 1923. Serial No. 620,157.

*To all whom it may concern:*

Be it known that I, HENRY J. SCHULTE, a citizen of the United States, residing at Anaheim, in the county of Orange, State of California, have invented a new and useful Nonskidding Device for Vehicles, of which the following is a specification.

My invention relates to anti-skidding devices employed on vehicles to prevent skidding thereof on wet pavements, and is particularly applicable to use with automobiles.

It is a well known fact that large tires, or tires which are not fully inflated, when used upon an automobile, will cause the automobile to skid upon wet pavements with greater frequency than where a small and fully inflated tire is employed. This is due to the fact that in large tires and poorly inflated tires a broad surface of contact is provided with the road surface between which the water and dust, in form of a thin mud, acts as a lubricant. When the tire is fully inflated so that it is quite hard, the area of contact thereof is considerably reduced, and the weight of the machine, being entirely concentrated upon small contact areas, forces the mud out from under the tire and allows engagement with the road surface so that the likelihood of skidding is greatly lessened. It is further found that a wheel having a sharp edge, such as would be presented by a band of iron, will engage the road surface in such a manner that skidding is prevented.

It is an object of my invention to provide an expansible member which may be attached to a vehicle wheel, such as an automobile, and which is provided with a very narrow outer edge which is adapted to engage the road surface, and thus prevent skidding of the vehicle upon which it is employed.

It is a further object of the invention to provide a device of this character which is normally in unexpanded position, but which may be expanded at the will of the driver when the road conditions are such as would cause skidding.

The especial advantages of my invention and further objects thereof will be made evident hereinafter.

Referring to the drawings, which are for illustrative purposes only,

Fig. 2 is a fragmentary section taken upon a plane represented by the line 2—2 of Fig. 1.

Fig. 3 is an enlarged fragmentary face view, with the inner plate of the anti-skidding device broken away to clearly show the shape and arrangement of the projectable members employed therewith.

Fig. 5 is an enlarged fragmentary detail showing the manner in which the operating levers are connected to the projectable members.

Figure 1:
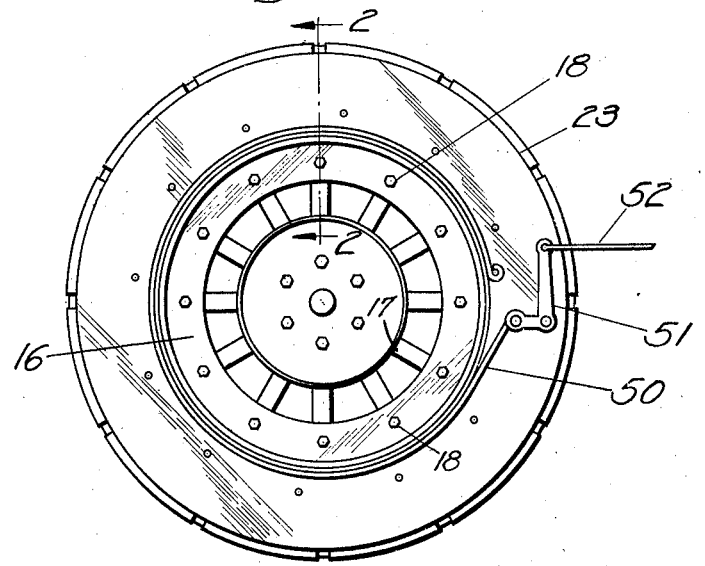
Fig. 1 is a face view of the inside of an automobile wheel equipped with an anti-skidding device embodying the features of my invention.

As shown in Figs. 1 and 2 of the drawing, a plate 12 is mounted upon the inner face of an automobile wheel 14 in such a manner that the plate rests adjacent to the tire 15. The inner edge of the plate 12 is provided with a cylindrical web 16 which joins an annular ring 19 by which the plate 12 is attached to the spokes 17 of the wheel 14 by means of bolts 18. Upon the face of the plate 12, an inner plate 20 is mounted, this plate having an inwardly extending cylindrical web 21, as shown in Fig. 2. The plate 20 is spaced away from the plate 12 and projectable members 23 are placed between the plates in the manner shown in Figs. 3 and 4. The projectable members 23 consist of segmental plates each having a tongue 24 extending from one end thereof and a slot 25 formed in the other end thereof to form interlocking means. When the plates are placed in the arrangement shown, the tongue 24 of each plate extends into the slot 25 of the plate adjacent thereto. At the lower right hand corner 30 of each plate, the forked end 31 of a lever 32 is connected, a pin 33 being employed in this connection as shown in Fig. 5. The lever 32 is one arm of a bell crank 35 which pivots upon a pin 36 extending between the plates 12 and 20. The downwardly extending arm 37 of each bell crank has the lower end 38 thereof forked, as shown, for engagement of operating pins 40 which extend laterally from a circular band 42 mounted upon the cylindrical web 21 which extends inwardly from the inner edge of the inner plate 20.

It will be seen that by rotating the band 42 upon the cylindrical web 21, the bell cranks 35 may be caused to swing upon their pivots 36 and the plates 23 thus moved radially between the plates 12 and 20. In Fig. 3, the bell cranks 35 are disposed in position to hold the plates 23 in retracted position. By moving the band 42 upon the cylindrical web 21 in the direction indicated by the arrow 38 in Fig. 3, the downwardly extending arms 37 of the bell cranks 35 may be swung into the position shown in Fig. 4, and the plates 23 projected from the retracted position shown in Fig. 3 to the projected position shown in Fig. 4.

A spring 45, extending between a hook 46 mounted upon the underside of the web 21 and a pin 47 projecting inwardly from the band 42 through an opening 48 in the cylindrical web 21, may be employed to hold the band normally in a clockwise direction when a rotative force is not applied thereto for the purpose of rotating the band in a counter clockwise direction indicated by the arrow 38 in Fig. 3, to cause the expansion of the plates 23.

Figure 4:
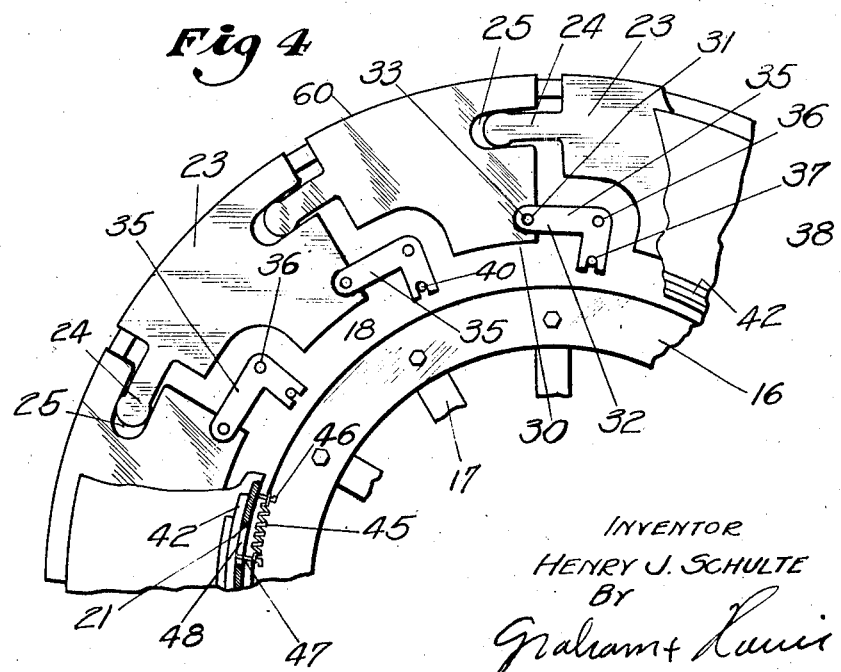
Fig. 4 is a fragmentary view similar to Fig. 3, showing the projectable members in projected position in which engagement with the road surface is accomplished.

For the purpose of rotating the band 42 in the direction indicated by the arrow 38, a brake band 50, as shown in Fig. 1, is disposed around the band 42 and is provided with a lever 51 for constricting the brake band 50 upon the band 42. The lever 51 may be actuated from the driver's seat through a link 52 when it is desired to project the plates 23 as shown in Figs. 3 and 4. During the ordinary travel of an automobile equipped with my invention, the cylindrical web 21 and the band 42 revolve freely within the brake band 50 and the segments 23 rest in retracted position as shown in Fig. 3. When conditions are encountered under which skidding might occur, the expansible member provided by the segments 23 may be projected by constricting the brake band 50 upon the band 42, as by moving the lever 51, operable through the rod 52. The frictional engagement between the brake band 50 and the band 42 retards the rotation of the band 42 and produces a relative movement between the band 42 and the web 21 in the direction of the arrow 38. This movement between the band 42 and the web 21 results in a swinging of the bell cranks 35, through the pins 40, from the position shown in Fig. 3 into the position shown in Fig. 4, thereby causing the segments to be projected into the position shown in Fig. 4. The engaging edges of the segments 23 may be adapted in any suitable manner for engagement with the surface of the road. From the foregoing, it will be seen that the plates 12 and 20 cooperate to form a channel in which the segments 23 are projectably retained, and that the segments 23 cooperate to form an expansible road engaging member.

It will be perceived that when the plates 23 are normally retracted, they rest within the outer circumference of the tire 15 and therefore do not come in contact with the road surface, but, when expanded, these plates, as shown in Figs. 1 and 4, may extend slightly beyond the outer circumference of the tire with the result that contact with the road surface is assured.

The inventor is aware that there are various means by which his invention may be practiced, but in this presentation thereof shows but a single embodiment and desires that the scope of the invention be designated and limited solely by the following claims.

I claim as my invention:

1. In combination with a vehicle wheel: an expansible road engaging member formed of interlocking segments and mounted upon said wheel; and means comprising bell cranks in a circular series for expanding said member into engagement with the road surface.

2. In an ati-skidding device for employment upon a vehicle wheel, the combination of: a member adapted to be mounted upon a vehicle wheel, said member having a radial annular channel therein; an expansible member formed of interlocking segments and disposed in said channel; and means for expanding said expansible member into engagement with the road surface.

3. A device, as defined in claim 2, in which said means for expanding said expansible member include a band and a member for frictionally engaging said band to cause its rotation relative to said wheel.

4. In combination with a vehicle wheel; an expansible road engaging member comprising interlocked cooperating segments; and means for projecting said segments into engagement with the road surface.

5. In combination with a vehicle wheel; an expansible road engaging member comprising interlocked cooperating segments; means for normally holding said member in unexpanded position; and means for projecting said segments into engagement with the road surface.

6. In a device of the class described, in combination with a vehicle wheel; a member adapted to be mounted on said wheel, said member having an annular channel therein; an expansible member comprising a number of interlocked segmental plates associated together; and means for expanding said expansible memebr into engagement with a road surface.

7. A device as defined in claim 6, in which said means for expanding said expansible member include a band and a member for frictionally engaging said band to cause its rotation relative to said wheel.

8. A device as defined in claim 6, in which said segmental plates provide a substantially continuous annular engaging surface.

9. In combination with a vehicle wheel; an inner plate mounted to said wheel; an outer plate secured to said inner plate and spaced away from said inner plate so as to provide a space therebetween; engaging members disposed in said space, said engaging members arranged to provide a substantially continuous engaging surface; and means for projecting said engaging members in a manner to engage the surface of the road.

10. In combination: an expansible road engaging member comprising interlocked segments; and means for projecting said segments into engagement with a road surface.

11. In combination: an expansible road engaging member comprising interlocked segments; means for normally holding said member in unexpanded position; and means for projecting said segments into engagement with road surfaces.

12. In combination: an expansible road engaging member comprising interlocked segments; and means for projecting said segments into engagement with a road surface, said projecting means comprising a circular series of levers.

13. In combination: an expansible road engaging member comprising segments; and means for projecting said segments into engagement with the road surface, said projecting means comprising levers circularly arranged.

14. In combination: an expansible road engaging member comprising segments; means for projecting said segments into engagement with the road surface, said projecting means comprising levers circularly arranged; and means for normally holding said member in unexpanded position.

In testimony whereof, I have hereunto set my hand at Los Angeles, California, this 12th day of February, 1923.

HENRY J. SCHULTE.